United States Patent [19]
Boehland, Jr.

[11] 3,818,868
[45] June 25, 1974

[54] BIRD HOUSE
[75] Inventor: Robert R. Boehland, Jr., Linn, Wis.
[73] Assignee: Feather Hill Industries, Inc., Zenda, Wis.
[22] Filed: Mar. 30, 1973
[21] Appl. No.: 346,704

[52] U.S. Cl. ................................................ 119/23
[51] Int. Cl. ............................................ A01k 31/00
[58] Field of Search .................................... 119/23

[56] References Cited
UNITED STATES PATENTS
| | | | |
|---|---|---|---|
| 1,587,804 | 6/1926 | Stein | 119/23 |
| 2,944,515 | 7/1960 | Mura | 119/23 |
| 3,078,826 | 2/1963 | Bear | 119/23 |
| 3,410,248 | 11/1968 | Vail | 119/23 |

Primary Examiner—Russell R. Kinsey
Assistant Examiner—J. A. Oliff
Attorney, Agent, or Firm—Wolfe, Hubbard, Leydig, Voit & Osann

[57] ABSTRACT

A bird house includes a series of compartments formed of disposable material and sandwiched between two vertically spaced platforms. Connecting means normally holding the platforms and compartments together are releasable to permit the house to be disassembled for cleaning, the old compartments being discarded and replaced with new ones.

12 Claims, 14 Drawing Figures

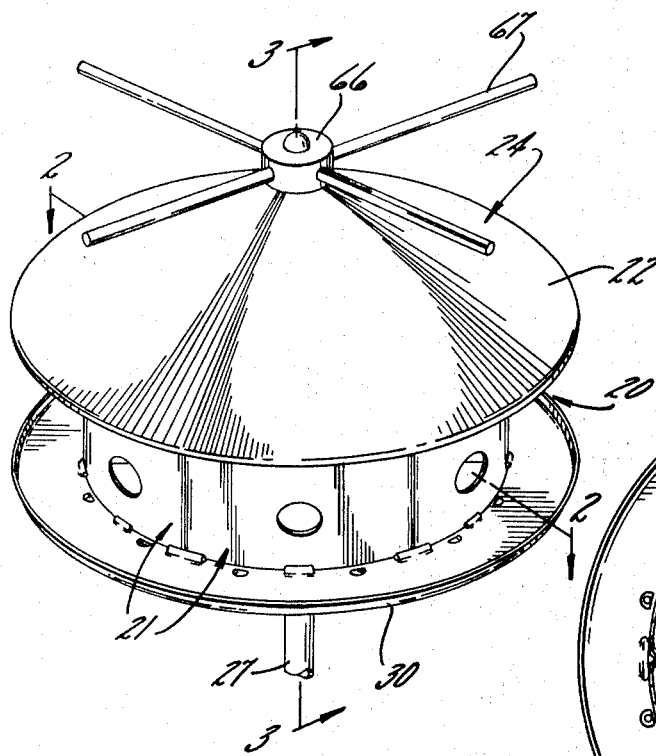
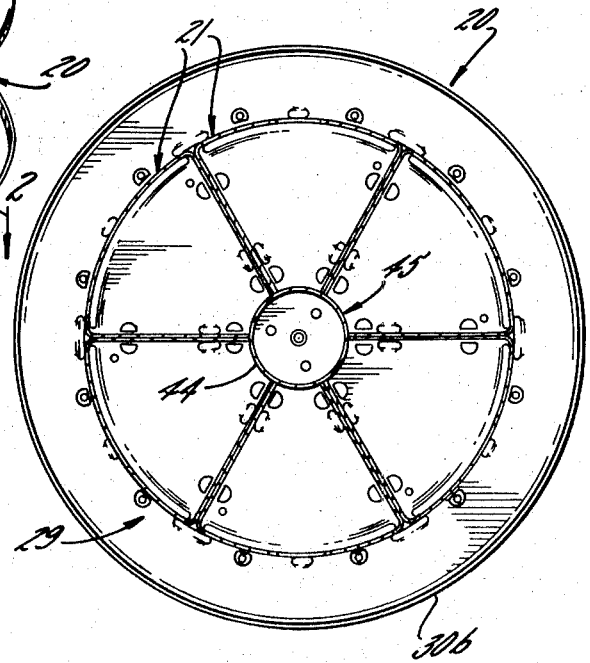
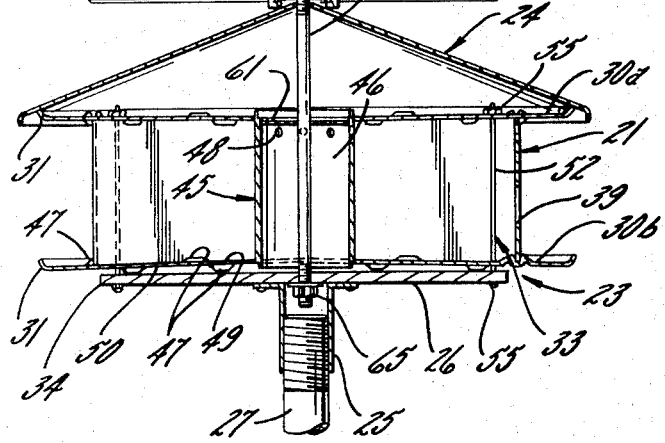
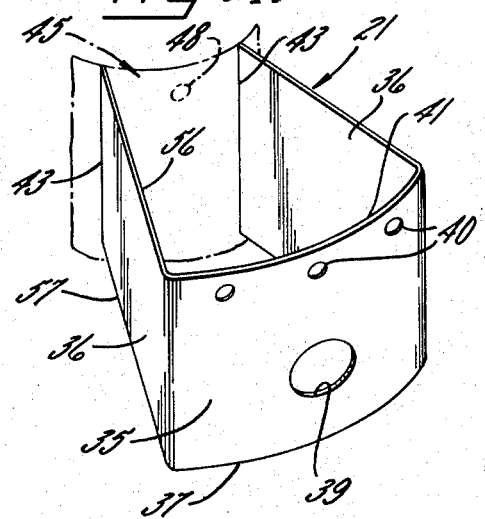

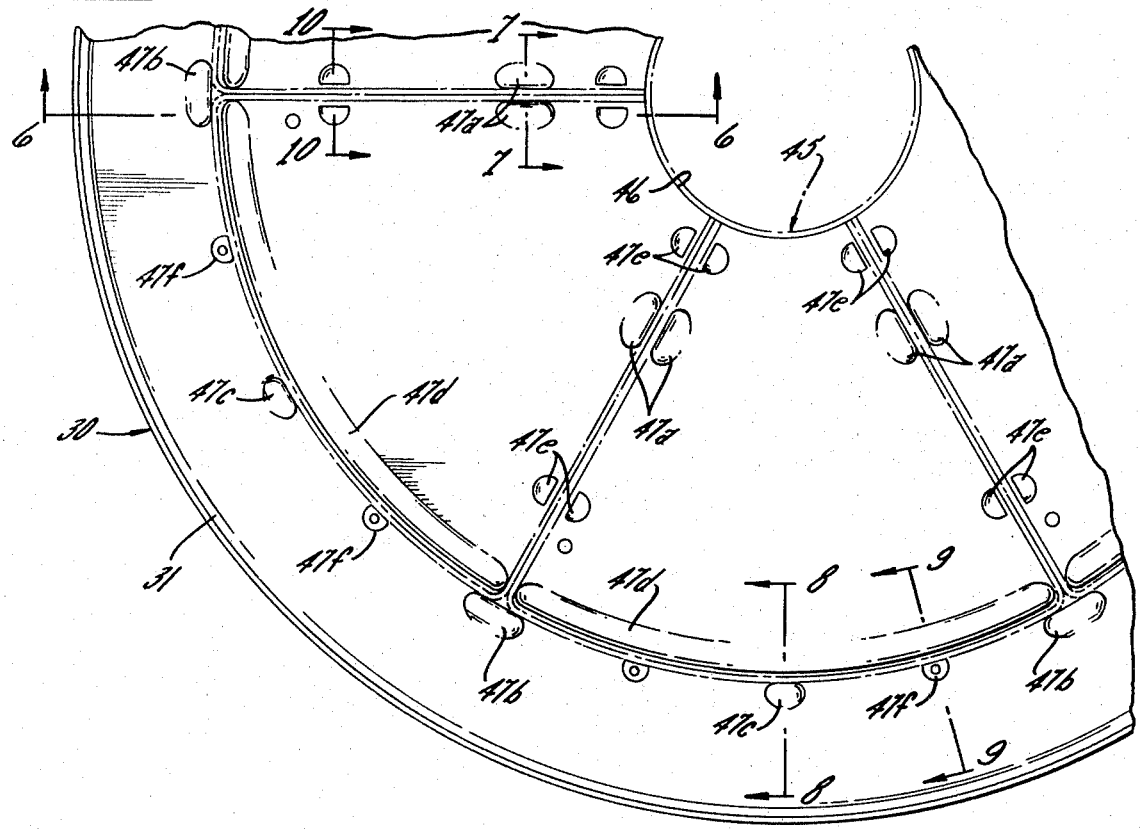
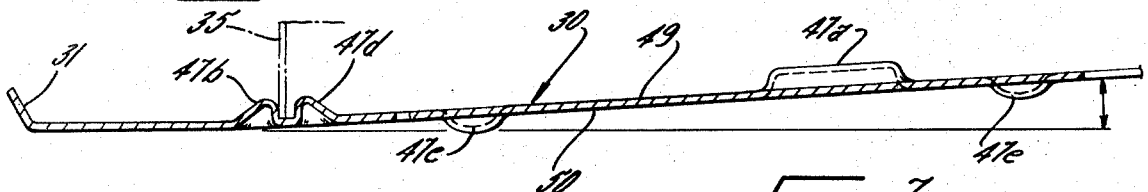
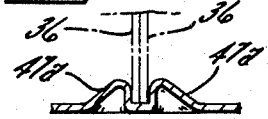
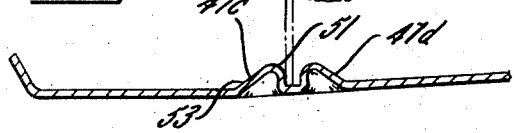
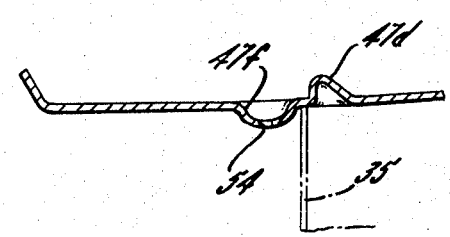
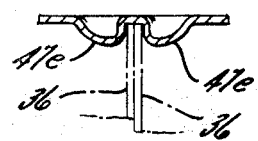

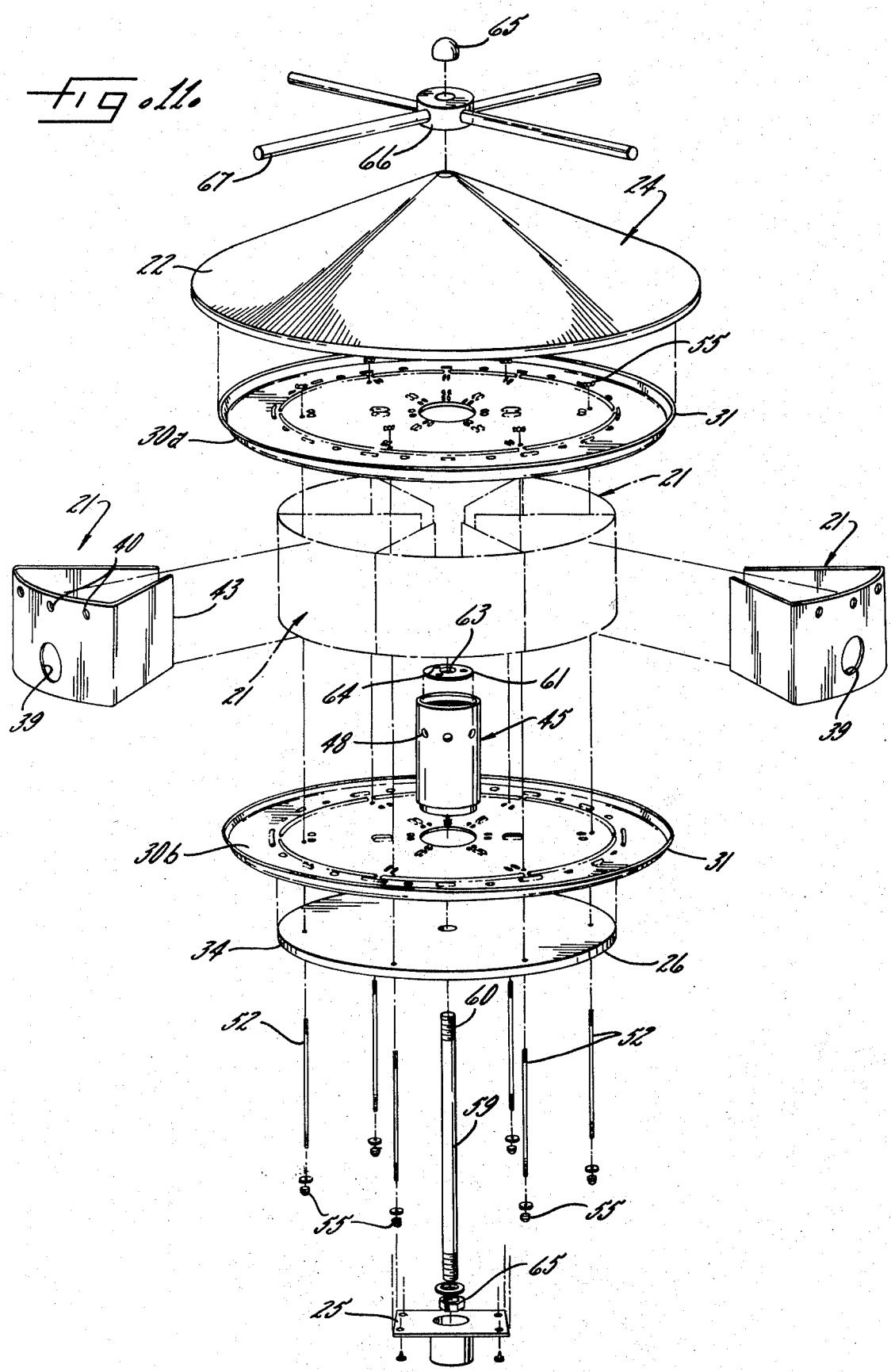

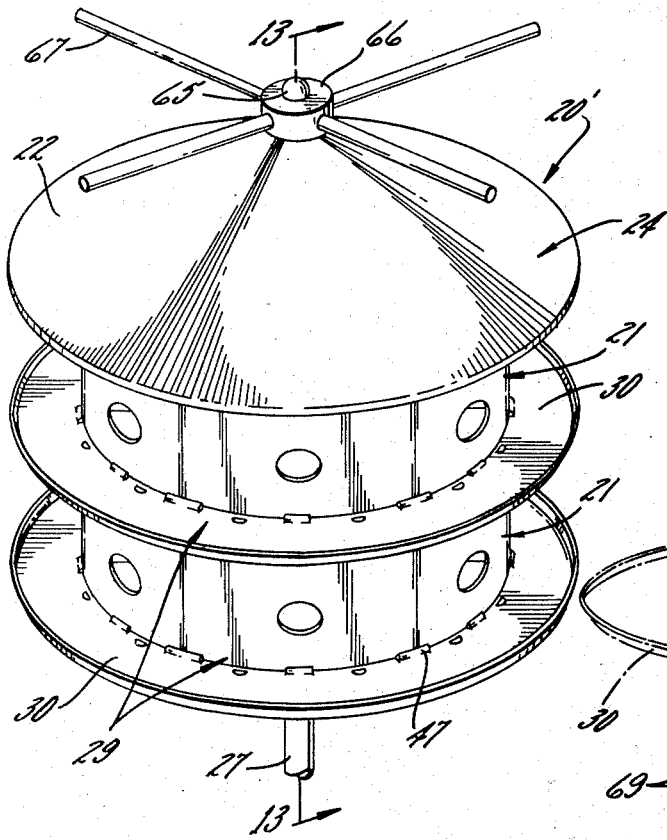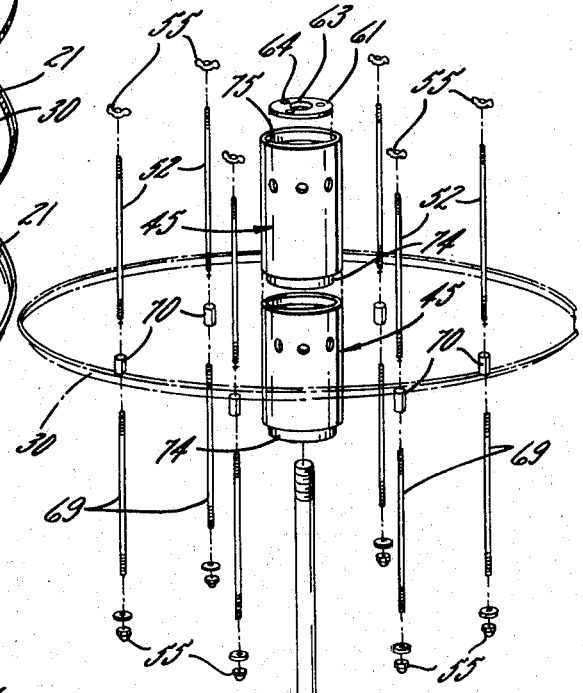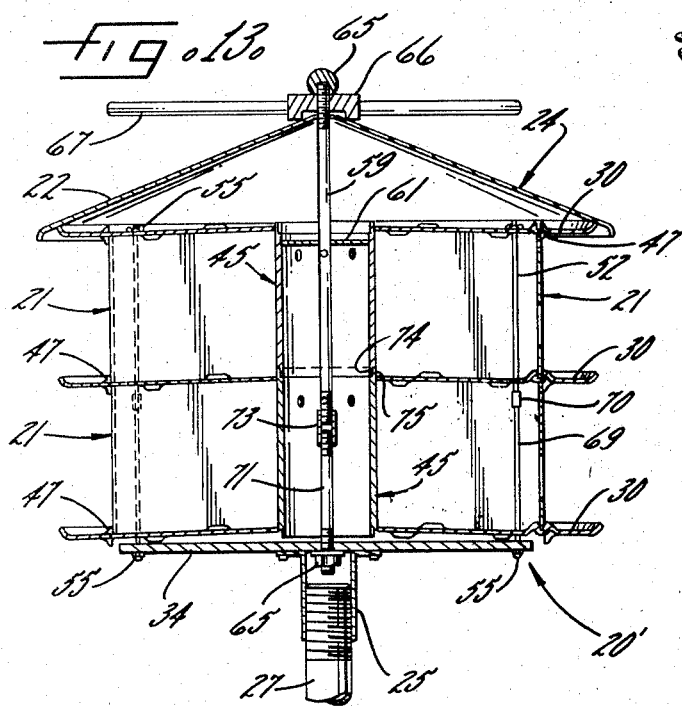

BIRD HOUSE

BACKGROUND OF THE INVENTION

This invention relates generally to a bird house and, more particularly, to the type of bird house which is divided into a plurality of separate nesting compartments such as for a colony of purple martins. A bird house of this general type is disclosed in Bruhns U.S. Pat. No. 3,696,792 wherein nesting compartments are stacked on top of each other to create a multiple story structure.

SUMMARY OF THE INVENTION

The primary object of the present invention is to provide a new and improved bird house of the above general character which is of particularly unique and simple construction enabling the bird house to be disassembled and cleaned more easily of dirt and old nests than prior houses.

A more detailed object is to form parts of the compartments of disposable material to be discarded and replaced with new parts when the bird house is cleaned.

Another object is to construct the bird house so that it is of lighter construction to enable the use of a less expensive pole for supporting the house and so that it includes better systems for circulating air through the compartments and for draining the compartments of water.

Invention also resides in the provision of a novel platform between each story of compartments, the platform serving both as the top of a lower story of compartments and as the bottom of the next upper story of compartments and being adapted uniquely to support the walls of the compartments in both the stories in fixed positions without the use of adhesives, nails, screws or the like between the platform and the walls.

These and other objects and advantages of the present invention will become more apparent from the following detailed description when taken in conjunction with the accompanying drawings.

BRIEF DESCRIPTION OF THE DRAWINGS

FIG. 1 is a perspective view of a one-story bird house embodying the novel features of the present invention.

FIG. 2 is a cross-sectional view taken substantially along line 2—2 of FIG. 1.

FIG. 3 is a cross-sectional view taken substantially along line 3—3 of FIG. 1.

FIG. 4 is an enlarged perspective view of one of the compartments of the bird house.

FIG. 5 is an enlarged fragmentary plan view of a part of the bird house.

FIGS. 6, 7, 8, 9 and 10 are enlarged cross-sectional views taken substantially along lines 6—6, 7—7, 8—8, 9—9 and 10—10, respectively, of FIG. 5.

FIG. 11 is an exploded perspective view of parts of the bird house.

FIG. 12 is a perspective view of a multiple story bird house embodying the novel features of the present invention. FIG. 13 is a cross-sectional view taken substantially along line 13—13 of FIG. 12.

FIG. 14 is an exploded perspective view of parts of the multiple story bird house.

DETAILED DESCRIPTION OF THE PREFERRED EMBODIMENT

As shown in the drawings for purposes of illustration, the present invention is embodied in a bird house 20 containing a plurality of compartments 21 and is adapted particularly to house a colony of birds such as purple martins. Herein, the compartments are supported on a base 23 (FIG. 3), each of the compartments serving as a nesting area for one pair of the birds. A conically shaped roof 24 covers the compartments and a bracket 25 screwed to the underside 26 of the base adapts the house for mounting on a pole 27 to support the house above ground level. Each year it is desirable that the bird house be cleaned of old nests and dirt prior to the return of the birds to the house.

In accordance with the primary aspect of the present invention, the nesting compartments 21 in the bird house are formed of disposable material so as to enable the house to be cleaned more easily and with much less effort than is possible with prior houses of the same general character. For this purpose, a series of the nesting compartments is arranged as a one story modular unit 29, the compartments in the unit being sandwiched between upper and lower platforms 30a and 30b. The latter normally are connected together by rod means 33 to captivate the compartments between the platforms and the rod means may be disconnected easily from the platforms to disassemble the bird house for cleaning. With this arrangement, the old nesting compartments may be discarded and replaced with new ones so that only the platforms need to be cleaned.

Moreover, each of the platforms is virtually identical to the other so that the bird house may be assembled to include several stories of compartments by simply stacking several of the modular units on top of each other. When the bird house is assembled of several stacked units, only one of the platforms is used between adjacent stories of compartments, the one platform serving both as the lower platform for the upper unit and the upper platform for the lower unit. Thus, with this arrangement, the bird house not only is adapted for easy assembly and disassembly to facilitate cleaning, but also, the bird house is constructed so that it easily may be increased in size to accommodate more birds by simply stacking one or more of the modular units together.

In the present instance, each of the platforms 30 is formed of molded plastic, the lower platform 30a serving as a portion of the base 23 while, in a one-story house as illustrated in FIG. 3, the upper platform 30b serves as a portion of the roof 24, the other portion of the roof being defined by a plastic cone 22. Although virtually any shape of platform may be used depending upon the general shape desired for the bird house, each of the platforms herein is generally circular in shape, the upper and lower platforms being positioned concentrically of each other and each including an upwardly projecting lip 31 formed around the periphery thereof. The lower platform is secured to the upper side of a circular plate 34 which also forms a portion of the base and is of a diameter smaller than the diameter of the platform. The mounting bracket 25 is secured to the underside of the plate and projects downwardly thereof to telescope with the pole 27 upon which the bird house is to be mounted.

As shown in FIG. 2, there are six nesting compartments in the series of compartments forming each modular unit 29. Advantageously, the compartments are each formed of disposable paperboard so that, when the bird house 20 is disassembled for cleaning, the compartments 21 may be discarded instead of having to be cleaned. Thus, only the platforms 30 need to be washed off to clean the bird house of old nests, the old paperboard compartments being replaced with new ones when the house is reassembled.

Herein, each of the compartments 21 is generally pie-shaped and includes an arcuate outer wall 35 (FIG. 4) and two generally radial interior walls 36 extending inwardly toward the center of the unit from opposite ends of the exterior wall. Preferably, each of the compartments is formed of a generally rectangular piece of the paperboard which is weather-treated to protect the paperboard against the elements. The opposite end portions of the piece of paperboard are folded relative to an intermediate portion to form the two radial interior walls 36, the intermediate portion defining the exterior wall. Spaced above the lower edge 37 of the exterior wall is an opening 39 which permits the birds to enter and leave the compartment. In addition, a plurality of air holes 40, herein three, are spaced evenly across the exterior wall adjacent the upper edge 41 thereof to provide ventilation for the interior of the compartment. Extending between the inner ends 43 of the radial walls is a portion 44 of a cylindrical paperboard sleeve 45 which projects axially between the center portions of the upper and lower platforms 30a and 30b, into a central opening 46 (see FIG. 5) in the upper platform and serves as the arcuate inner wall 44 for each of the compartments. Air holes 48 (FIGS. 3 and 4) also are formed in each inner wall portion so that air can circulate from the outside, through the compartments and upwardly through the sleeve.

To hold the walls 35 and 36 of the compartments 21 against moving laterally across the upper and lower platforms 30a and 30b, each of the platforms includes guide means in the form of a plurality of vertically projecting bosses 47 extending from both the upper and lower sides 49 and 50 thereof. As shown in FIGS. 5 and 6 on the lower platform 30a, the upwardly projecting bosses 47a are arranged in pairs and form a pattern in the platform corresponding to the general shape of the compartments. Some of the bosses 47b, 47c and 47d are arranged to form two concentric rings centered on the platform and are spaced radially inwardly of the periphery thereof. The outer ring is formed of angularly spaced, alternating long and short bosses 47b and 47c which coact with the inner ring of bosses 47d to hold the exterior walls of the compartments against moving radially on the platform. The inner ring is formed of the elongated arcuate bosses 47d which are spaced angularly from each other and each arcuate boss provides a backing against radially inward movement by the exterior walls 35 of the compartments 21. Each of the short bosses 47c is centered between the ends of one of the arcuate bosses and thus engages the center of the outer surface of one of the exterior walls so that the latter is captivated against moving radially relative to the platform (see FIG. 6). The long bosses 47b extend across the space between the adjacent ends of adjacent arcuate bosses 47d and overlap the adjacent end portions of the two arcuate bosses so that the folded corners between the interior radial walls 36 and the exterior walls 35 of each two adjacent compartments also are blocked against moving radially outwardly relative to the platform.

Spaced radially inwardly of each of the long bosses 47b approximately halfway between the inner ring of arcuate bosses 47d and the center of the platform is the pair of bosses 47a each of which is equal in size to the long bosses 47b in the outer ring. The two bosses in each of the pairs are spaced from each other and fit against the lower edge portions of the opposite sides of the two adjacent interior radial walls 36 of two adjacent compartments so as to captivate the two walls against moving angularly relative to the platform (see FIG. 7). Thus, it is seen that with this arrangement, the upwardly projecting bosses on the upper side of the lower platform coact together against the lower edge portions of the compartments to captivate the compartments in fixed positions on the platforms without the use of adhesives, nails, screws or the like.

In a similar manner, the ear-shaped bosses 47e and 47b projecting downwardly from the lower surfaces 50 of each of the platforms 30, captivate the upper edge portions of the compartments 21 in fixed positions. As shown in FIGS. 5 and 9, an outer ring formed of a plurality of the ear-shaped bosses 47b is spaced radially inwardly from the periphery of the platform a distance equal to the spacing between the outer ring on the upper side of the platform and the periphery. Moreover, one of the ear-shaped bosses 47b is positioned between each of the longer and shorter bosses 47b and 47c formed on the upper side of the platform so that two of the ear-shaped bosses engage the exterior wall of each compartment adjacent the upper edges thereof. Captivating the two adjacent radial walls 36 of each two of the compartments are two pairs of the ear-shaped bosses 47e (see FIGS. 5 and 10), one pair of the ear-shaped bosses being located adjacent each of the two adjacent folded corners of the two compartments and the other pair being spaced radially inwardly and located adjacent the inner ends 43 of the walls 36. As shown in FIG. 10, the two adjacent walls fit between the two bosses 47e in each pair of bosses and thus are captivated against angular movement relative to the platform.

Each of the bosses 47 in the platforms 30a and 30b are formed by molding depressions in the opposite sides 49 and 50 of the platforms. Although the various bosses differ in their lengths, each of the bosses is of generally the same triangular cross-sectional shape and includes a generally vertical surface 51 (see FIG. 8) for abutting its associated wall of the compartments and a slanted surface 53 which converges toward the platform upon progressing toward the platform from the projected edge of the vertical wall. Advantageously, the depressions in the upper surfaces 49 of the platforms resulting from the formation of the ear-shaped bosses 47b also serve to help drain water from the platforms and include apertures 54 which are centered in the ear-shaped bosses so that water on the platform can flow into the ear-shaped depressions, through the apertures and off the platforms. To further facilitate drainage, each of the platforms slants downwardly upon progressing outwardly from the central opening 46 toward the apertures so that water drains out of the compartments and through the apertures.

The rod means 33 holding the upper and lower platforms 33a and 33b together comprises a plurality of connecting rods 52, herein six, which extend upwardly from angularly spaced positions located inwardly of the inner ring of the bosses 47d and are slightly longer than the distance between the spaced platforms. Each of the rods projects through the base plate 34, through both of the platforms and is threaded on its opposite ends. Nuts 55 (FIG. 3) threaded on the ends of the rods hold the two platforms together against the upper and lower edges 56 and 57 of the walls 35 and 36 forming the compartments. To hold the roof cone 22 on top of the unit, a central pipe 59 extends upwardly through the base 23, the sleeve 45 and the roof, the upper end 60 of the pipe projecting upwardly beyond the roof and the lower end of the pipe extending downwardly into the bracket 25. Preferably, a plastic guide disk 61 (FIG. 11) frictionally fitted into the upper end of the sleeve is provided with a central hole 63 slightly larger than the diameter of the pipe and serves as a support to keep the pipe from wobbling in the sleeve. Air holes 64 in the disk spaced around the central hole permit air to circulate upwardly through the sleeve and into the space between the upper platform 30a and the cone 24. Nuts 65 threaded on opposite ends of the pipe hold the roof on top of the unit as shown in FIG. 3. A cylindrical cap 66 telescoped over the upper end portion of the pipe also is held against the roof by the upper nut 65 and includes a plurality of radially extending shafts 67 which project horizontally above the cone to serve as perches for the birds.

In a multiple story bird house 20' of the exemplary construction, additional rod sections 69 are connected together with the slightly larger rods 52 by small threaded connectors 70 so as to extend vertically through the base plate 26 and the uppermost platform 30'a to secure the desired number of units 29 together. In addition, a section 71 is connected together with the central pipe 59 by a threaded coupling 73 to mount the roof cone 22 on the upper platform. Also, the sleeves 45 in each of the units are formed with male and female fittings 74 and 75, the male fittings herein being formed on the upper ends of the sleeves and the female fittings being formed on the lower ends of the sleeves. Accordingly, when two or more units are stacked on top of one another, the male fittings on the sleeves in the lower units telescope into the female fittings on the sleeves in the upper unit to form a sturdy connection between the two sleeves. With this arrangement, the uppermost platform 30a forms a portion of the roof 24 and, by virtue of the bosses 47 being formed on both sides of each of the intermediate platforms, only one intermediate platform is needed between each two stories of compartments, the intermediate platform serving both as the upper platform for the lower unit and the lower platform for the upper unit.

I claim as my invention:

1. In a bird house, the combination of a circular base including a first circular platform of molded plastic, a series of pie-shaped compartments supported on top of said platform adjacent each other and around the center portion of said platform, a sleeve extending upwardly from the center portion of said platform, each of said compartments including an arcuate inner wall defined by a portion of said sleeve, an arcuate outer wall with an opening therethrough to admit birds into the interior of said compartment and two side walls extending radially inwardly from opposite ends of said outer wall to engage said sleeve so said inner wall is disposed between said side walls, a second platform concentric with said first platform and mounted on top of said walls to enclose said compartments, a plurality of first air holes formed in each of said outer walls above said openings, a second air hole formed in each of said inner walls to permit air to circulate from the outside, through each of the compartments and into said sleeve, each of said platforms slanting downwardly upon progressing radially outwardly from the center thereof to drain water from said compartments, guide means on said first and second platforms and engaging said outer walls and said sidewalls to position said outer walls and said side walls against horizontal movement relative to said platforms, means normally coacting between said first and second platforms to captivate said compartment walls between said platforms and releasable to permit said bird house to be disassembled to remove said compartments and to facilitate cleaning of said platforms, said outer wall and said side walls being formed of a generally rectangular piece of material whose opposite end portions are folded toward each other to form said side walls, both said sleeve and said rectangular piece of material being formed of disposable paperboard to said walls may be discarded and replaced with new walls when cleaning the bird house.

2. In a bird house the combination of a circular base including a first circular platform of molded plastic, a series of pie-shaped compartments supported on top of said platform adjacent each other and around the center portion of said platform, a sleeve extending upwardly from the center portion of said platform, each of said compartments including an arcuate inner wall defined by a portion of said sleeve, an arcuate outer wall with an opening therethrough to admit birds into the interior of said compartment and two side walls extending radially inwardly from opposite ends of said outer wall to engage said sleeve, a second platform concentric with said first platform and mounted on top of said walls, means normally coacting between said first and second platforms to captivate said compartment walls between said platforms and releasable to permit said bird house to be disassembled to remove said compartments and to facilitate cleaning of said platforms, said compartment walls being formed of disposable paperboard to be discarded and replaced with new walls when cleaning the bird house.

3. A bird house including a base comprising an upwardly facing lower platform, a roof including a downwardly facing upper platform spaced above said base, a first series of nesting compartments sandwiched between said base and said roof, each of said compartments being of a predetermined shape and including interior and exterior walls formed of a disposable material and extending vertically between said roof and said base, said exterior walls having an opening therethrough to admit birds into said compartment, guide means on said roof and said base and engaging said walls to position the latter against horizontal movement relative to said roof and said base, said guide means comprising a plurality of vertically projecting bosses formed on said platforms, the walls of said compartments fitting between adjacent pairs of said bosses and being captivated thereby against horizontal movement relative to said platforms and means between said roof and said base normally connecting said roof and said base to captivate said compartments therebetween, said connecting means being adapted to be disconnected from between said roof and said base to permit said walls to be removed and disposed of when cleaning said house.

4. A bird house as defined by claim 3 wherein said bird house further includes an intermediate platform spaced between said upper and lower platforms, said first series of compartments being sandwiched between said lower platform and said intermediate platform, a second series of compartments sandwiched between said upper platform and said intermediate platform.

5. A bird house as defined by claim 4 wherein said connecting means includes a plurality of removable rods extending vertically between said platforms normally to hold said compartments sandwiched between said platforms.

6. A bird house as defined by claim 5 wherein said platforms are circular in shape and concentric with each other, said house further including a cylindrical sleeve formed of disposable material and concentric with said platforms, said sleeve extending vertically between the center portions thereof and said compartments being positioned around said sleeve, each of said compartments being generally pie-shaped and one said interior walls in each compartment being defined by an arcuate portion of said sleeve, two of said interior walls extending radially outwardly from said sleeve to connect integrally with the opposite ends of said exterior wall.

7. A bird house as defined by claim 6 wherein said sleeve includes a first section fitting between said lower platform and said intermediate platform and a second section fitting between said upper platform and said intermediate platform, said latter platform having a central opening therein with a diameter slightly larger than the diameter of said sleeve, said sleeve sections each having a male fitting on one end thereof and a female fitting on the opposite end thereof, the male fitting from one of said sections and the female fitting from the other of said sections being telescoped together through said opening.

8. A bird house as defined by claim 6 wherein each of said platforms is formed of molded plastic, each of said compartments being formed of a generally rectangular piece of weather-treated disposable paperboard whose opposite end portions are folded toward each other to form the two radial interior side walls of the compartment.

9. A bird house as defined by claim 8 wherein said base includes a circular plate attached to the underside of said lower platform, said roof including a plastic cone with a base diameter greater than the diameter of said upper platform, said cone being secured on top of said upper platform, a pipe extending upwardly through said plate and said cone and having opposite end positions detachably connected to said plate and said cone to hold the latter on said upper platform.

10. A bird feeder as defined by claim 9 including a lip extending upwardly around the periphery of each of said platforms, a plurality of apertures in each of said platforms adjacent said lip for draining water off said platforms, each of said platforms slanting downwardly upon progressing radially outwardly from the center thereof to drain water toward said apertures.

11. A bird feeder as defined by claim 9 including a plurality of air holes formed in each of said exterior walls above said bird opening, an air hole formed in each of the interior walls defined by the arcuate portions of said sleeve to permit air to circulate from the outside, through each of the compartments and into said sleeve.

12. A bird feeder as defined by claim 11 including a guide disk supported in the upper end one of said sleeve, said disk having a central opening through which the upper end portion of said pipe passes and is held by said disk against wobbling within said sleeve, said disk further having a plurality of air holes formed therein whereby the air vented into the sleeve from the compartments is vented out of said sleeve underneath said cone.

* * * * *